Feb. 10, 1953 — M. H. GROVE ET AL — 2,627,870
FLUID FLOW CONTROL APPARATUS
Filed April 2, 1945 — 2 SHEETS—SHEET 1
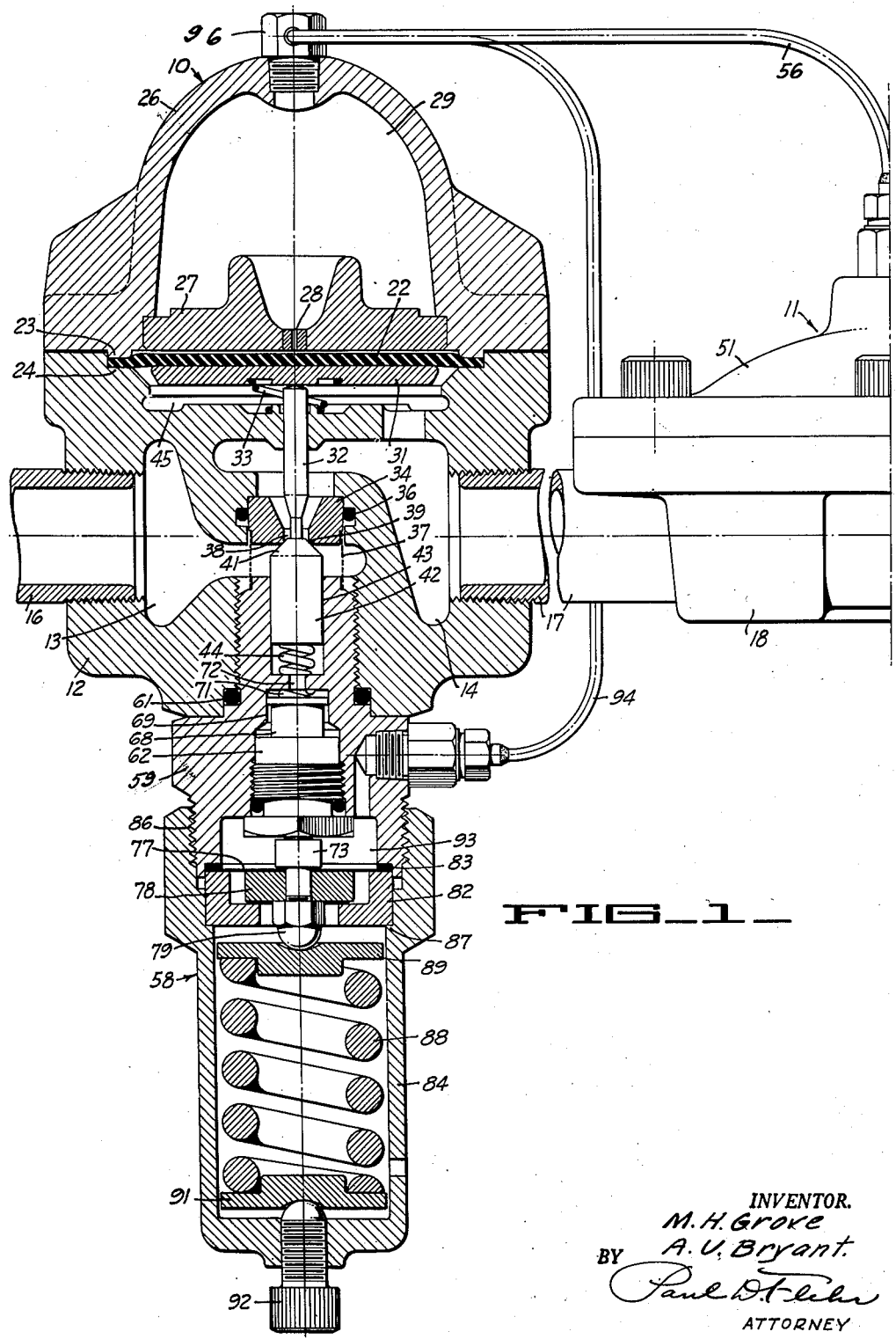
FIG_1_
INVENTOR.
M. H. Grove
A. V. Bryant.
BY Paul D. Flehr
ATTORNEY Feb. 10, 1953 — M. H. GROVE ET AL — 2,627,870
FLUID FLOW CONTROL APPARATUS
Filed April 2, 1945 — 2 SHEETS—SHEET 2
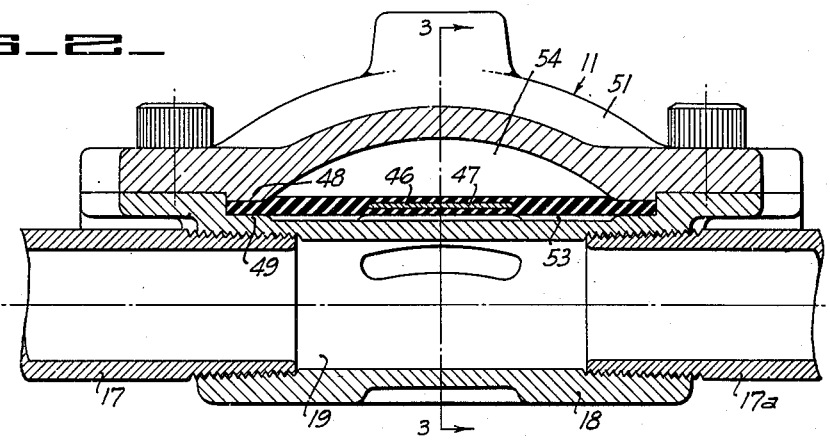
FIG_2_
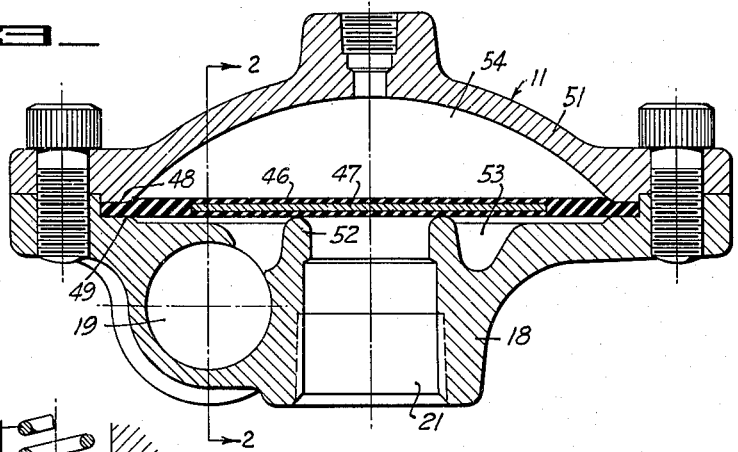
FIG_3_
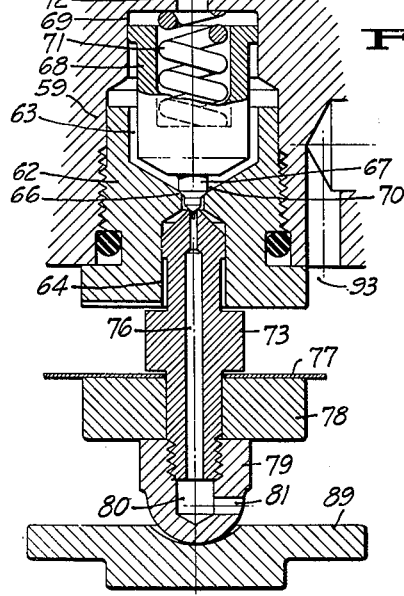
FIG_4_
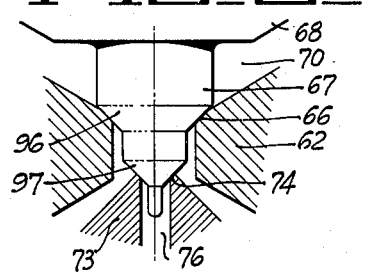
FIG_5_
INVENTOR.
M. H. Grove
A. V. Bryant.
BY Paul D. Flehr
ATTORNEY

Patented Feb. 10, 1953

2,627,870

UNITED STATES PATENT OFFICE

2,627,870

FLUID FLOW CONTROL APPARATUS

Marvin H. Grove, Piedmont, and Austin U. Bryant, Berkeley, Calif., assignors, by mesne assignments, to Grove Regulator Company, a corporation of California Application April 2, 1945, Serial No. 586,136

2 Claims. (Cl. 137—505)

This invention relates generally to fluid flow control apparatus of the type making use of automatic pressure reducing regulation for supplying gas or other fluid to a low pressure system from a high pressure source.

In the operation of pressure reducing regulators such as are commonly employed on air and gas lines, it is frequently necessary to protect the low pressure side against excessive pressure. Unless such protection is afforded, abnormal conditions such as leakage through the pressure reducing regulator, at a time when no gas is being consumed from the low pressure side, may cause a building up of an unsafe pressure in the low pressure piping. The conventional way to provide such protection is to connect a "pop off" or pressure relief valve to the low pressure side of the regulator whereby when the pressure rises beyond a predetermined value gas is vented to the atmosphere. Conventional relief valves of this type make use of a diaphragm loaded by means of a compression spring.

Conventional apparatus as described above is not entirely satisfactory due to inherent defects and difficulties of adjustment. For example when it is desired to adjust the pressure reducing regulator for different outlet pressures, it is necessary to make corresponding adjustments of the pressure relief valve. This not only requires double manipulation of the two devices but in addition it is difficult to set the relief valve for venting fluid at a desired pressure above normal outlet pressure, without deliberately building up the outlet pressure to an abnormal value until the relief valve is operated. Also the loading springs used are subject to variations so that one cannot rely upon the point of opening remaining constant over a period of time.

It is an object of the present invention to provide a novel fluid flow control apparatus incorporating in combination a pressure reducing and a pressure relief valve, and with simplified common loading for both devices.

Another object of the invention is to provide apparatus of the above character which can be more readily adjusted in practice and which is more reliable in protecting the low pressure system.

Additional objects of the invention will appear from the following description in which the preferred embodiment has been set forth in detail in conjunction with the accompanying drawing.

Referring to the drawing:

Figure 1 is a side elevational view in cross-section illustrating apparatus incorporating the present invention.

Figure 2 is a cross-sectional detail showing the construction of the pressure relief device and taken along the line 2—2 of Figure 3.

Figure 3 is a cross-sectional detail taken along the line 3—3 of Figure 2.

Figure 4 is an enlarged cross-sectional detail showing the construction of the valve means and associated parts.

Figure 5 is a further enlarged detail showing the construction of the valve means.

The apparatus of the drawing consists generally of a pressure reducing regulator 10, and a pressure relief valve 11. As will be presently explained both of these devices are adapted to receive air or other gas under pressure to load the same, and this air is supplied from a common source.

The pressure reducing regulator illustrated embodies principles of the invention disclosed and claimed in Grove Patent No. 2,047,101. Thus the device in this instance consists of a body 12 provided with the inlet and outlet passages 13 and 14, which connect with the piping 16 and 17. Pipe 16 connects with a source of gas or fluid under pressure, while pipe 17 forms a part of the low pressure system from which gas is to be consumed. Pressure relief valve 11 also includes a body 18 having a passage 19 for connection with pipe 17, and a passage 21 through which gas is vented to the atmosphere or to a point of relatively low pressure. The passage 19 is connected to both pipe 17 and to pipe 17a which leads to the point of demand.

The pressure reducing regulator includes a flexible diaphragm 22 having its peripheral edge portion clamped between the annular surfaces 23 and 24, the latter being formed respectively on the dome part 26, and the body 12. The dome is provided with a rigid plate 27 extending in close proximity over the diaphragm 22, and this plate is provided with a flow restricting orifice 28. As explained in said Grove Patent 2,047,101 dome 26 forms a closed chamber 29 for receiving gas under pressure to provide a desired loading upon the diaphragm 22. Plate 27 in conjunction with orifice 28 provide a restriction against abrupt movements of the diaphragm in order to prevent chattering. The lower side of the diaphragm is engaged by the diaphragm plate 31, which in turn engages one end of the slidable thrust rod 32. A light compression spring 33 is shown for urging the diaphragm plate against the diaphragm.

The lower portion of rod 32 terminates adjacent a valve seat ring 34, which in turn is mounted within the valve body. The periphery of the seat ring is shown sealed against leakage by suitable means such as the resilient O ring 36. A circular screen 37 is shown disposed below the seat ring in order to screen out solid particles from fluid passing through the seat ring orifice 38. A conical seat 39 is formed on the seat ring 34 and is engaged by the conical faced valve member 41. The valve member is formed upon one end of a cylindrical member 42, which in turn is slidably fitted within the bore 43 and is urged by compression spring 44 toward closed position of the valve member. The space 45 below the diaphragm 22 is in free communication with the outlet passage 14, and therefore one side of the diaphragm is subjected to outlet pressure, whereas the other side is subjected to the pressure of gas within the dome chamber 29.

Assuming a definite loading pressure within the chamber 29, the regulator described above will automatically supply gas or fluid to the outlet passage 14 at a pressure somewhat below the loading pressure, depending upon the proportioning of the valve seat 39. For example in a typical instance where it is desired to maintain an outlet pressure of about 100 pounds, the corresponding loading in the chamber 29 may be 110 pounds. The pressure upon the inlet side may vary over a wide range as for example from say 150 pounds to several thousand pounds. The outlet pressure maintained may vary slightly with variations on the inlet side, but in no event will this pressure equal or exceed the loading pressure.

The pressure relief valve 11 in this instance includes a flexible fluid operated diaphragm 46, the central portion of which is shown reinforced by the imbedded metal disc 47. The flexible peripheral margin of this diaphragm is shown clamped between annular surfaces 48 and 49 formed respectively on the dome or cover part 51, and the body 18. Within the body there is an annular seat 52 engaged by the adjacent side of the diaphragm when the valve is closed. A chamber 53 extends beneath that part of the diaphragm surrounding the seat 52, and this chamber is in free communication with the passage 19. The other side of the diaphragm is exposed to gas pressure in the chamber 54 formed by the dome or cover part 51. The area of the diaphragm exposed to a gas in chamber 53 is substantially less than the area exposed to chamber 54. Therefore for a given gas pressure in chamber 54 a considerably higher pressure must be applied in chamber 53 to force the diaphragm off its seat to thereby permit free venting of gas to the atmosphere.

The chamber 54 of the dome 51 is directly connected to the chamber 29 of the pressure reducing regulator, as by means of a connecting pipe or tube 56. Thus the pressure within chambers 29 and 54 are substantially equal at all times.

It is possible to trap loading gas within the chambers 29 and 54 in order to maintain a desired loading. However it is preferable to use a small capacity loading regulator for this purpose, whereby an operator may readily increase or lower the loading pressure by a simple adjustment. A small loading regulator of the type disclosed in Patent No. 2,342,659 is satisfactory for this purpose.

A loading regulator 58 of novel construction is illustrated in the drawing and is mounted directly upon the body 12 of the main regulator. The closure plug 59 which is threaded into body 12 forms in effect the body of the loading regulator. Suitable means such as the resilient O ring 61 prevents leakage between the plug and body 12. The plug or body 59 is bored and threaded to receive the plug 62, which is formed with bores 63 and 64 extending into its opposite ends. A stationary valve seat 66 is formed between the bores 63 and 64 to thereby provide a connecting valve orifice. Cooperating with and extending through the seat 66 there is a small valve member designated generally at 67, which is formed on one end (lower end as illustrated) of the valve carrying member 68. The upper end of the valve carrying member 68 is guided within the bore 69, and a compression spring 71 serves to urge member 68 toward the seat 66. Port 72 serves to establish free communication between bores 43 and 69, so that by virtue of clearance about member 42 of the main pressure reducing regulator, the space 70 immediately above the seat 66 is in communication with the inlet passage 13.

Below the seat 66 there is a thrust member 73, the upper end of which is provided with a seat 74 through which the duct 76 communicates. Member 73 extends through the flexible diaphragm 77, and through the diaphragm plate 78 underlying the diaphragm. Its lower end is threaded to receive the clamping cap 79, which has a passage 80 communicating with passage 76 and with the space on the lower side of the diaphragm 77, the latter being in free communication with the atmosphere through the port 81.

The peripheral edge portion of the diaphragm 77 is gripped between the ring 82, and an annular surface formed on the lower end of the body 59. A suitable gasket 83 can be provided to prevent leakage. Ring 82 is held against the body by a casing 84 which has a threaded attachment 86 with the body, and which has a shoulder 87 engaging the ring 82.

A coiled compression spring 88 is disposed within the casing 84 and serves to load the diaphragm 77. One end of this spring is seated upon the disc 89, which in turn is seated upon the rounded end of cap 79. The other end of the compression spring is seated upon disc 91, which is engaged by the inner end of a set screw 92 whereby the tension of the spring can be adjusted.

The space 93 above the diaphragm 77 is shown connected by pipe 94 to a fitting 96 on the dome 26 of the main regulator. Thus the outlet or low pressure side of the loading regulator 58 is connected to the chambers 29 and 54 of the main loading regulator and relief valve.

The small valve member 67 is provided with two valve surfaces 96 and 97 which cooperate respectively with the seats 66 and 74. When valve surface 96 is in engagement with seat 66 valve surface 97 likewise engages seat 74, and therefore at this time there can be no flow of gas through the loading regulator. Assuming that pressure on the outlet side (i. e. space 93) drops below a given value the pressure on the upper side of diaphragm 77 is lowered to such a point that spring 88 forces member 73 upwardly. Such upward movement unseats valve surface 96 with respect to seat 66, thus permitting gas from the inflow side to pass through seat 66, past member 73, to the outlet space 93, and thence through pipe 94 to the chambers 29 and 54. When the outlet pressure has been restored to the desired value the valve surface 96 again engages and closes upon the seat 66. If the pressure in chambers 29 and 54 should increase beyond the value desired, as for example due to an increase in temperature, diaphragm 77 is flexed downwardly to unseat valve surface 97 which respect to seat 74, thus permitting gas from space 93 to pass through ducts 76 and 81 and vent to the atmosphere. When sufficient venting has taken place to restore the desired pressure, then valve surface 97 again closes upon seat 74.

Operation of the complete apparatus described above can be reviewed as follows: Loading regulator 58 is set to produce a desired outflow pressure from the main pressure reducing regulator 10. This can be checked in practice by use of a pressure gauge connected to piping 17 or 17a. This loading remains the same irrespective of use of gas in the low pressure system. If there should be a complete shut off of gas consumption and the pressure reducing regulator should not shut off with absolute tightness, then there may be a gradual rise in pressure on the outlet side until such pressure rises to an unsafe value above the normal regulated pressure. Before such rise in pressure on the outlet side has become dangerously excessive, diaphragm 46 is forced upwardly against the pressure of gas in chamber 54 to open the same with respect to the seat 52, thus permitting venting of gas through passage 21 to the atmosphere. When the pressure has been restored to a lower safe value by such venting, diaphragm 46 is automatically restored to closed position. As an example of pressure values which can be used in an actual installation, the pressure reducing regulator 10 can be adjusted to deliver say 100 p. s. i. to the piping 17, 17a, with a loading pressure in chamber 29 of 110 p. s. i. The same pressure of 110 p. s. i. will be applied to diaphragm 46 in the chamber 54. The ratio between the area exposed to gas in chamber 54, and the area exposed to fluid in passage 19, can be such that diaphragm 46 is forced to open position when the pressure in passage 19 increases to a value of say 120 p. s. i. Assuming now that the loading regulator 58 is adjusted so that the pressure reducing regulator delivers a regulated pressure of say 75 p. s. i., the loading of the pressure relief valve 11 is likewise altered whereby a comparable margin over 75 p. s. i. is provided before the relief valve automatically opens.

Aside from the advantages of automatic adjustment for both pressure reducing and relief valves, the invention totally eliminates loading springs, with the exception of the relatively small loading spring in the loading regulator.

We claim:
1. In fluid flow control apparatus, a pressure reducing regulator having an inlet adapted for connection with a source of fluid under pressure and an outlet adapted for connection with a low pressure system, said pressure reducing regulator having a fluid operated diaphragm and means forming a space on one side of the diaphragm adapted to receive gas under pressure to load the diaphragm, the regulator serving to maintain an outlet pressure slightly less than the gas loading pressure, a pressure relief valve having an inlet connected to the outlet side of the pressure reducing regulator, said pressure relief valve including a fluid pressure operated diaphragm and means forming a space on one side of the diaphragm adapted to receive gas under pressure to load the same, said pressure relief valve being adapted to vent gas from the outlet and thus relieve pressure responsive to an outlet pressure in excess of the loading pressure upon the last named diaphragm, said spaces being in free intercommunication whereby the loading gas pressures upon said diaphragms are the same at all times, and means enabling an increase or a decrease in gas loading pressure whereby the settings of both said pressure reducing regulator and said pressure relief valve are altered simultaneously.

2. Apparatus as in claim 1 in which said last means comprises an adjustable loading regulator having its inlet connected to the inlet side of the pressure reducing regulator and its outlet connected to said chambers.

MARVIN H. GROVE.
AUSTIN U. BRYANT.

REFERENCES CITED

The following references are of record in the file of this patent:

UNITED STATES PATENTS

| Number | Name | Date |
|---|---|---|
| 1,805,702 | Mastenbrook | May 19, 1931 |
| 1,861,506 | Nelson | June 7, 1932 |
| 2,181,428 | Grove | Nov. 28, 1939 |
| 2,270,304 | Jacobsson | Jan. 20, 1942 |
| 2,342,659 | Grove | Feb. 29, 1944 |
| 2,357,318 | Donaldson | Sept. 5, 1944 |